March 25, 1930. R. J. LANGER 1,752,095
STANCHION
Filed Dec. 23, 1927
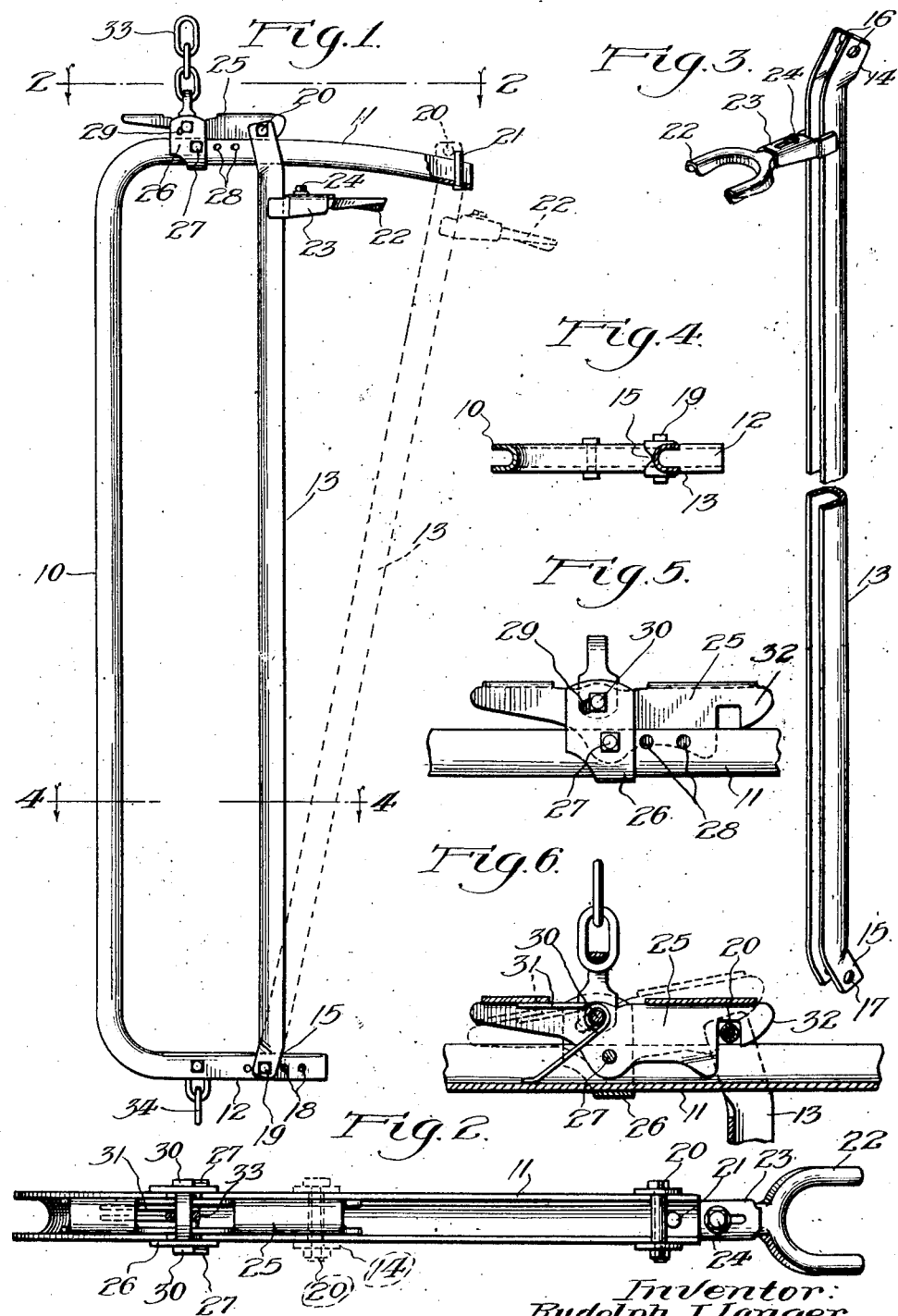

Patented Mar. 25, 1930

1,752,095

UNITED STATES PATENT OFFICE

RUDOLPH J. LANGER, OF MONTICELLO, IOWA, ASSIGNOR TO FRANKLIN EQUIPMENT COMPANY, OF MONTICELLO, IOWA, A CORPORATION OF IOWA

STANCHION

Application filed December 23, 1927. Serial No. 242,052.

This invention relates to stanchions and particularly to novel features of construction thereof, which render the device exceedingly economical to manufacture and add to its efficiency and simplicity.

The stanchion may be adjusted laterally for different sizes of cattle, and the swinging side bar, by which the stanchion is opened, is provided with a fork which is adjustable so as to engage a stall post when the swinging bar is in any desired open position.

The construction of the swinging side bar is a special feature of my invention, in that it is a simple, one piece member, adapted to co-operate at one end with the bottom bar of the stanchion to form a hinged connection therewith and to co-operate at its other end with the top bar and the latch device thereon without the use of malleable castings or other fittings, with which these side bars have usually been equipped.

Another novel feature of the invention is the latch construction, which is exceedingly simple and easy to operate, and effective for its intended purpose.

In the drawings:

Figure 1 is a front elevation of a stanchion embodying my invention, the swinging side being shown in full lines in closed position and by dotted lines in open position.

Figure 2 is a top plan view taken in the plane of the line 2—2 of Figure 1, looking downwardly as indicated by the arrows, but showing the swinging side bar in open position by solid lines and in closed position by dotted lines.

Figure 3 is a perspective view of the swinging side bar member, broken away to show the cross section thereof.

Figure 4 is a sectional view taken in the plane of the line 4—4 of Figure 1, looking in the direction indicated by the arrows.

Figure 5 is a front elevation, enlarged, of the latch device as connected to the top bar.

Figure 6 is a vertical sectional view, also enlarged, through the latch device and top bar of the stanchion, and showing the upper end of the swinging side bar engaged by the latch.

In that embodiment of my invention which I have chosen to illustrate in the drawings, 10 indicates the fixed side of the stanchion, 11 the top and 12 the bottom. These parts are preferably integral with each other and are formed of a metal bar which is U-shaped in cross section, the channel of the U-bar facing outwardly. The top bar 11 is preferably longer than the bottom bar 12 to form a support for the swinging side bar 13 when the latter is in open position, as indicated in dotted lines in Figure 1.

The swinging side bar 13 is also preferably formed of metal U-shaped in cross section and split or cut away at each of its ends as indicated at 14 and 15, to form forked ends or spaced apart extensions having apertures 16 and 17, respectively, extending through each of said split sides or extensions.

The lower bar 12 of the stanchion is provided with a plurality of apertures 18, the purpose of which is to permit the split end 15 of the swinging bar 13 to be placed over the bar 12 and to be connected thereto in any desired adjusted position by a bolt 19 extending through the apertures 17 and registering apertures 18. The bolt 19 forms a pivotal connection between the bars 12 and 13.

At the upper end of the swinging side bar 13, a bolt 20 extends through the apertures 16 in the split portion 14, to form a keeper member. The top bar 11 of the stanchion extends between the split portions 14 in slidable engagement therewith. When the swinging side bar 13 is in closed position, this bolt or keeper 20 is intended to be engaged by the latch device hereinafter described, and when the bar is swung to its open position, the keeper 20 contacts with a stop pin 21 at the free end of the bar 11.

Near the top of the bar 13 is an outwardly extending fork which is adapted to engage a stall post to hold the bar in stationary position when the stanchion is open. The fork proper, indicated at 22, is connected to a slotted bracket 23 by a bolt 24; the bracket 23 being welded or otherwise connected to the bar 13. The slot in the bracket 23 permits the fork 22 to be clamped in adjusted position so as to properly contact with a stall post and thus support the swinging side 13.

The latch 25 is formed of a single piece of metal, which is substantially an inverted U in cross section, and is pivotally connected to the top bar 11. I preferably provide a U-strap 26, the upright walls of which engage the outer surfaces of the top bar 11. A bolt 27 passes through registering apertures in the walls of the strap 26, through registering apertures in the lower portion of the latch 25 about midway between its ends, and through one set of a plurality of sets of apertures 28 in the top bar 11. A plurality of sets of apertures 28 is provided to permit the latch 25 to be connected to the bar 11 in any desired position to properly balance the stanchion and to engage the keeper 20 of the swinging side bar 13. The U-strap 26 is also provided with registering slots 29 in its upright walls, preferably above and slightly to one side of the bolt 27 which forms the pivotal connection between the latch and top bar. The curved sides of the slot 29 coincide with the arcs of circles drawn about the bolt 27 as their centers. A bolt 30 extends through the walls of the latch member 25, and the slots 29, and about this bolt 30 is wrapped a spring 31 which contacts with the inner wall of the latch toward its hand hold end and with the top bar 11, to normally hold the latch in locked position in engagement with the keeper 20 on the swinging side bar. When the hand hold end of the latch 25 is pressed downwardly against the tension of the spring 31, the bolt 30 moves in the slots 29 of the strap 26 and the opposite end of the latch 25 is raised so that the engaging hook 32 thereof is lifted away from the keeper 20 and the stanchion may be opened. As soon as pressure is released from the hand hold portion of the latch, said latch automatically returns to its locking position.

The latch 25 is cut away in its upper wall to permit a suspension chain 33 to be connected to the bolt 30. The bottom of the stanchion may be provided with a stall attaching chain 34.

Modifications may be made without departing from the scope of my invention and I do not intend to be limited to the particular details herein shown and described except as pointed out in the appended claims.

I claim as my invention:

1. In a stanchion comprising a side bar having a top and a bottom bar fixedly connected thereto, a swinging side bar, U-shaped in cross section, having a portion of each end cut away to form spaced apart extensions, the extension members of one end being adapted to embrace and be pivotally connected to the bottom bar of the stanchion, the other end extension members straddling and having sliding engagement with the top bar, a keeper connecting the free ends of the fork on said last mentioned end members, and a latch secured to the top bar and adapted to engage the keeper.

2. In a stanchion comprising a side bar having a top and a bottom bar fixedly connected thereto, a swinging side bar, U-shaped in cross section, having its ends rearwardly bent and cut to provide spaced apart parallel extensions, the extension members of one end straddling and pivotally and adjustably connected to the bottom bar of the stanchion, the other end extension members straddling and having sliding engagement with the top bar, a keeper connecting the free ends of the fork on said last mentioned end members, and a latch secured to the top and adapted to adjustably engage the keeper.

3. A stanchion comprising a side bar and integral, laterally extending top and bottom bars, U-shaped in cross section, and having the channel outwardly extending, a plurality of sets of registering apertures through the walls of the top and bottom bars, a U-shaped swinging side bar having its ends cut away to form spaced apart apertured extension members, a bolt extending through the apertures at one end of the swinging side bar and one set of apertures of the bottom bar to form a pivotal connection between them, a bolt extending through the spaced extensions at the top of the side bar above the top bar to form a keeper, a latch adjustably and pivotally secured to the top bar and adapted for engagement with the keeper.

4. A stanchion comprising a side bar having a top and a bottom bar fixedly connected thereto, a swinging side bar pivotally connected to the bottom bar and adapted for engagement at its free end with the upper bar to close the stanchion, a latch for engaging the swinging side bar and a pair of upwardly extending slotted walls pivotally and adjustably connected to the top bar, a bolt extending through the latch member above its pivotal connection with the bar and having sliding engagement with said slotted walls, a spring and suspension means connected to the said bolt.

5. In a stanchion, a latching device comprising a latch member pivotally secured between its ends to a fixed part of the stanchion, a U-shaped strap connected to said fixed part, said strap being provided with a pair of registering slots in its upright arms, a suspension bolt extending through said slotted strap and the pivoted latch member, and a spring for maintaining the latch in locked position, the latch member having a hooked end for engagement with a keeper on a movable part of the stanchion.

6. In a stanchion, a latching device comprising an inverted U-shaped latch member pivotally connected between its ends to a fixed part of the stanchion, a U-shaped strap provided with curved registering slots in its upright arms, the strap being connected to a fixed part of the stanchion by the means forming the connection between the pivoted member and said stanchion, a suspension bolt extending through the slotted strap and through apertures in the pivoted latch member, a hook on one end of the latch member for engagement with a keeper on a movable part of the stanchion, and a spring wrapped around said bolt for maintaining the latch in locking position.

7. In a stanchion including a fixed top bar and a movable side bar, a latching device comprising a single piece of metal substantially an inverted U in cross section, the one end constituting a hand hold and the other a hook end for engagement with the movable side bar, a U-shaped strap member having upright side walls embracing the fixed stanchion bar and the latch member between its ends, a bolt extending through the strap member, the fixed bar, and the latch member, the upright walls of the strap member being provided with registering, curved slots, a second bolt extending through said slotted strap member and the latch member above said first mentioned bolt, a spring wrapped around said second bolt and bearing against the under surface of the latch member and said fixed bar, and a suspension chain connected to said second mentioned bolt.

8. In a stanchion comprising a fixed side bar having laterally extending top and bottom bar portions, a swinging side bar forked at its ends to provide parallel spaced ears adapted to straddle the respective top and bottom bar portions, means adjustably connecting the ears of one end of said swinging side bar to said bottom bar portion, a keeper connecting the ears of the other end of said swinging bar, and a latch secured to said top bar and adapted to engage said keeper.

In testimony, that I claim the foregoing as my invention I affix my signature, this 17th day of December, 1927.

RUDOLPH J. LANGER.